United States Patent
Morrow et al.

(10) Patent No.: US 7,234,718 B1
(45) Date of Patent: Jun. 26, 2007

(54) BICYCLE FRAME

(76) Inventors: David D. Morrow, 1344 Garnet Ave., San Diego, CA (US) 92109; Hondre C. Moreno, 1344 Garnet Ave., San Diego, CA (US) 92109

( * ) Notice: Subject to any disclaimer, the term of this patent is extended or adjusted under 35 U.S.C. 154(b) by 147 days.

(21) Appl. No.: 10/965,351

(22) Filed: Oct. 14, 2004

(51) Int. Cl.
*B62K 19/00* (2006.01)

(52) U.S. Cl. .................. 280/281.1; 280/274; 280/283; 280/286

(58) Field of Classification Search .............. 280/274, 280/275, 281.1, 283, 286
See application file for complete search history.

(56) References Cited

U.S. PATENT DOCUMENTS

| | | | | |
|---|---|---|---|---|
| 2,756,071 | A | 7/1956 | Riva | 280/283 |
| 5,314,207 | A | 5/1994 | Camfield et al. | 280/828 |
| D392,603 | S | 3/1998 | Quick | D12/111 |
| 5,725,227 | A * | 3/1998 | Mayer | 280/284 |
| 5,791,674 | A | 8/1998 | D'Aluisio et al. | 280/284 |
| D410,217 | S | 5/1999 | Tsang-Chun | D12/111 |
| 5,992,870 | A | 11/1999 | LaRiviere | 280/276 |
| 6,131,934 | A * | 10/2000 | Sinclair | 280/284 |
| 6,189,908 | B1 | 2/2001 | Lu | 280/284 |
| 6,283,487 | B1 * | 9/2001 | Torre | 280/283 |
| 6,450,520 | B1 * | 9/2002 | Girard | 280/284 |
| 6,450,521 | B1 | 9/2002 | Turner | 280/284 |
| 6,513,823 | B1 | 2/2003 | Chen | 280/284 |
| 6,581,711 | B1 | 6/2003 | Tuluie | 180/227 |
| 6,688,626 | B2 * | 2/2004 | Felsl et al. | 280/275 |
| 6,695,335 | B1 | 2/2004 | Gaastra | 280/288.1 |
| 6,886,846 | B2 * | 5/2005 | Carroll | 280/284 |
| 2002/0185837 | A1 | 12/2002 | Aloy Estelrich | 280/288.1 |
| 2003/0067137 | A1 | 4/2003 | Chen | 280/278 |

FOREIGN PATENT DOCUMENTS

WO    WO 01/15965    3/2001

* cited by examiner

*Primary Examiner*—Lesley D. Morris
*Assistant Examiner*—Marc A. Scharich
(74) *Attorney, Agent, or Firm*—Frank G. Morkunas

(57) ABSTRACT

A two-piece bicycle frame pivotably attached together at a pivot point with a biasing mechanism adjacent to the point of attachment. The bias mechanism bears an angle of between 30° to 60° relative to true horizontal. Each frame section has a relative plane which planes in relation to one another bear an angle exceeding 180° when no weight is on the bicycle.

7 Claims, 2 Drawing Sheets

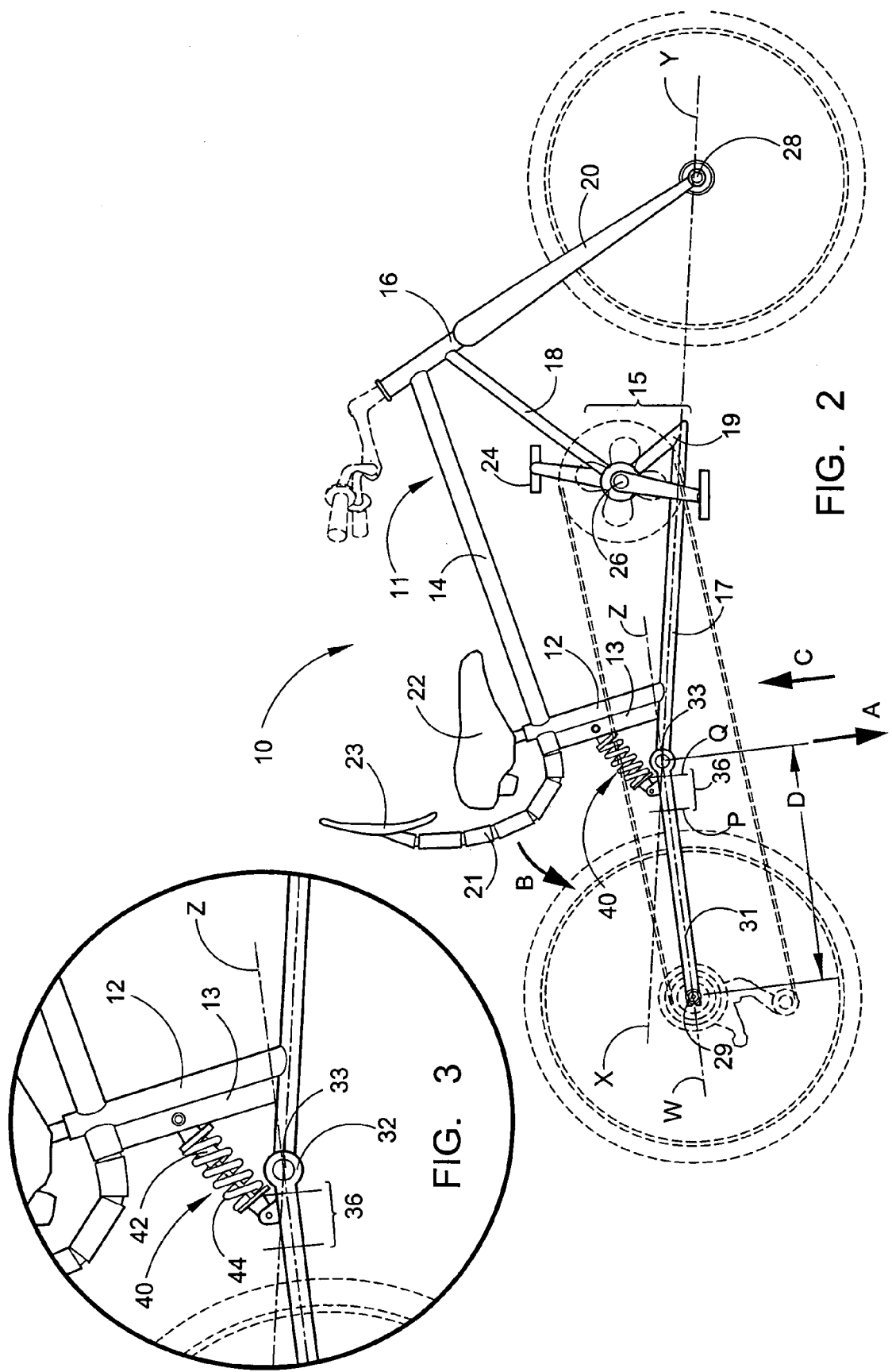

BICYCLE FRAME

CROSS REFERENCES TO RELATED APPLICATIONS

None.

STATEMENT REGARDING FEDERALLY-SPONSORED RESEARCH OR DEVELOPMENT

None.

BACKGROUND OF THE INVENTION

This present invention relates to an improvement in bicycle frames, and more particularly to an improvement to such bicycle frames to facilitate a smooth, low ride in a relative recumbent position thereby simulating a motorcycle ride. Such facilitation is realized by the unique two-piece frame with biasing mechanism properly positioned and attached to each piece.

Accordingly, several objects and advantages of my invention are to:

a. create a two-piece bicycle frame capable of pivoting at its point of attachment to accommodate bumps or rough roads;

b. establish a low-riding experience for a bicycle rider;

c. permit a bicycle rider to ride in a relative recumbent position;

d. absorb bumps and other rough movements is a softer manner while riding a bicycle over bumps or rough roads; and e. simulate the low-riding, soft-riding effect of a motorcycle for a bicycle.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a two-piece bicycle frame attached together at a pivot point with a biasing mechanism adjacent to the point of attachment bearing a pre-determined angle of between 30° to 60° relative to horizontal. Each frame section has a relative plane which planes in relation to one another bear an angle exceeding 180°. The pivot point permits an up and down movement of each frame section and the bias mechanism 'softens' the ride, whereas the respective angles of the two frame sections [front section with a Z-frame configuration for stress relief] and biasing mechanism prevent the bicycle and pedals from contacting the ground while pedaling and riding.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 2 is an elevation view of the bicycle frame of the present invention.

FIG. 3 is a detailed view of the biasing mechanism connected to the front and rear sections of the bicycle.

DETAILED DESCRIPTION OF THE INVENTION

Figure 1:
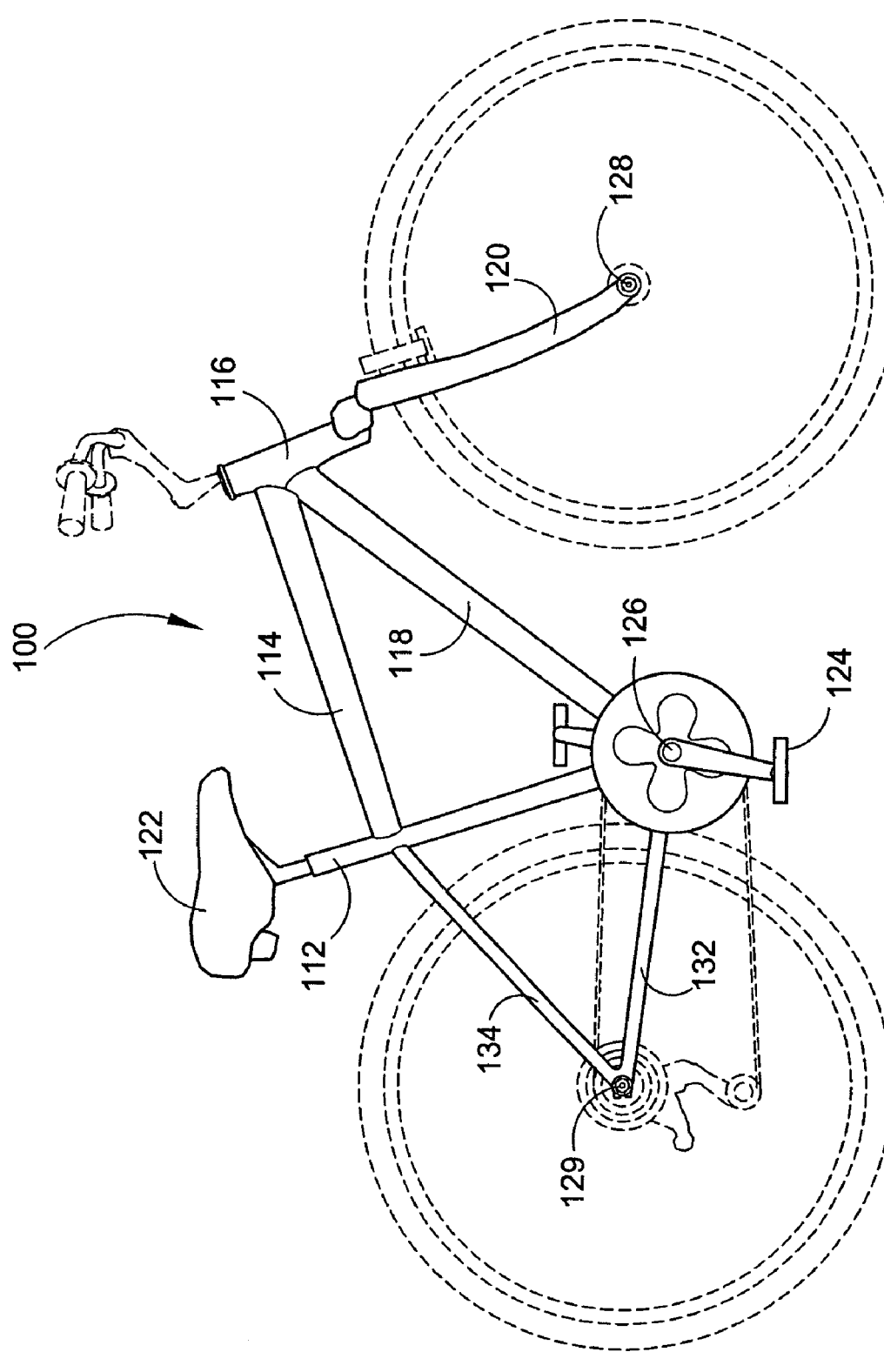
FIG. 1 is an elevation view of a prior-art bicycle frame.

Referring now to the drawings in detail and in particular to FIG. 2, reference character 10 generally designates a two-piece bicycle frame constructed in accordance with a preferred embodiment of the present invention. The invention 10 consists of a bike frame comprising two sections [front 11 and rear 31] with a biasing mechanism 40 connected to the two sections thereby allowing for a 'soft ride' in a relative recumbent position.

Most bike frames are of a single-piece construction. FIG. 1 is a typical prior-art bike frame 100. It has a seat tube 112 [into or onto which a suitable seat 122 can be attached], a back bone 114, a neck 116 [into or onto which handle bars (not shown) can be attached], a down tube 118, and typically two rear frames for the rear wheel consisting of a lower leg 132 extending rearward from the bottom of the seat tube 112 and an upper leg 134 extending downward and rearward from the top of the seat tube 112. A rear wheel [illustrated in phantom line] attaches to these structures 132, 134 at and through aperture 129.

A front wheel [also illustrated in phantom line] attaches to the front wheel fork 120 at and through aperture 128. A pedaling mechanism 124 is attached through the bottom crank bracket 126. Some bikes have a variety of suspension units attached to or part of the front fork 120 to smooth out a rough ride.

The present invention 10 is illustrated in FIG. 2. It has a front section 11 and a rear section 31. The front section 11 has a seat tube 12 [shown to be short but can be longer as in FIG. 1], a backbone 14, a neck 16, a down tube 18, a crank bracket 26, a crank riser 19, a base tube 17, and a seat tube 12. A front fork 20 can be attached to the neck 16 to support a front wheel [illustrated in phantom line] at and through the aperture [or attachment mechanism] 28 of the front fork 20. Suitable pedals 24 attach at the crank bracket 26. A seat 22 and seat back bone 21 with back rest 23 may be attached on or near to the seat tube 12.

As can be seen from the illustration, the riser 19 is directly attached to the base tube 17 at the front end of the base tube 17. From this point of attachment, the riser 19 is angled upward and rearward from the base tube 17 connecting at its terminal end to the crank bracket 26. The down tube 18 angles downward and rearward from the neck 16 connecting at its terminal end to the crank bracket 26. As so configured, the down tube 18, riser 19, and base tube 17 define a Z-shape, albeit with the down tube 18 not parallel to the base tube 17, nonetheless resembling a Z-like shape.

For purposes of illustration, discussion, and better understanding of the concept of this invention, base tube 17 is shown to have an X-Y plane, which is angled from the horizontal plane and which also is referred to as a first axis, and the swing arm 31 is shown to have a W-Z plane, which is angled from the horizontal plane and which also is referred to as a second axis. These two planes [first axis and second axis] do not share the same plane nor are they meant to be parallel to each other when 'at rest' [i.e., no external weight or force exerted on the bicycle and no one seated on the bicycle].

Each plane [X-Y and W-Z], respective first axis and second axis, has an angle of approximately 5° to approximately 40° greater than true horizontal. As shown in FIG. 2, the base tube 17 angles upward from true horizontal from its rear and the swing arm 31 angles upward from true horizontal from its front intersecting at the pivot point described below. As so configured, this combination of base tube 17, swing arm 31, and their respective angles at point of connection resemble an inverted V-shape.

At the rear end of the base tube 17 is a connector joint 33 [not visible in figure]. The rear section 31 is a swing arm which has a rear wheel aperture 29 [or attachment mechanism into which a rear wheel is connected] and a connector joint 32 at its forward end. The swing arm 31 and the front section 11 are pivotably connected to each other at their respective connector joints 32, 33. This connection is the pivot point of the two-piece bike frame.

A biasing mechanism 40 also is connected at its one end to the front section 11 and at its other end to the swing arm 31. The biasing mechanism 40 may be any type of force-exerting unit or force-resisting unit capable of functioning as described herein for the purposes set forth herein. Typical mechanisms suited for the intended purpose include, but are not limited to, a conventional coil [compression] spring with a piston cartridge therein, compression springs, torsion springs, torsion bars, hydraulic springs, hydraulic pistons, pneumatic pistons, and combinations thereof. The foot-pound rating of the bias mechanism and its placement on the swing arm 31 and onto the front section 11 is important such that, after such placement, it bears an angle relative to true horizontal of between approximately 30° to 60°.

It has been found that any conventional compression-type coil spring 44 and piston cartridge 42 combination rated between about 500 and 800 foot-pounds is well-suited for the purposes and functionality involved. A typical compression-spring-piston combinations suited for the intended purpose includes the Rockshox Brand, Model Name 'Super Deluxe', which has a load or tension capacity of approximately 750 foot pounds.

What is key to this present invention is the ability of the biasing mechanism 40 to maintain an angle between the base tube 17 [X-Y plane] and the swing arm 31 [W-Z plane] of approximately 185° to approximately 220° as measured from the swing arm 31 upward and forward to the base tube 17 while the bicycle is 'at rest' [i.e., base tube 17 and the swing arm 31 are connected, biasing mechanism 40 attached, wheels attached, and no load or weight placed on the bicycle]. Obviously, if measured downward and forward from the swing arm 31 to the base tube 17, the reciprocals of these approximate angles would be the angles; i.e., approximately 175° to approximately 140°, respectively.

With the swing arm 31 having a length [D as measured from center point of rear wheel aperture 29 to center point of the swing arm connector joint 32], placement of the biasing mechanism 40 onto the swing arm 31 should be at a distance no less than 10% of D as measured from the center point of its connector joint 32 rearward and no greater than approximately 25% of D as measured from the center point of its connector joint 32 rearward; this is referred to, and is, the 'sweet spot' of the two-piece frame and would be between points from P to Q designated as reference character 36.

If for example D=16 inches, the closest point Q should be to the center point of the connecter joint 32 is approximately 1.60 inches and point P should be no greater than approximately 4.00 inches from the center point of the connector joint 32.

The other end of the biasing mechanism 40 may be on the seat tube 12 or on a seat plate 13 attached to the seat tube 12 at a point approximately no higher up than approximately 25% to approximately 45% of the height of the seat plate 13 or the seat tube 12. For example, if the height [H] of the seat plate 13 is 10 inches, then the placement of the other end of the biasing mechanism 40 would be no greater than 4.50 inches up [or H×0.45] and no less than 2.50 inches up [or H×0.25]. After such placements, however, the angle of the biasing mechanism 40 should be, relative to true horizontal, approximately between 30° to 60°. Generally, any placements other than as described herein would not permit the two-piece frame to function as designed nor as intended.

The seat tube 12 of the present invention is substantially shorter than prior-art seat tubes 12. The purpose of the shorter seat tube 12 of the present invention is to simulate a low-rider motorcycle look, establish a recumbent riding/pedaling position, and to create a smooth ride when combined with the biasing mechanism 40 and its placement on the swing arm 31 and on the front section 11.

With proper placement and angles of the biasing mechanism 40, a properly selected biasing mechanism 40 as described herein to create a proper angle between the X-Y plane and the W-Z plane, as a rider engages the seat, the weight of the rider causes the seat tube 12 and the front of the swing arm 31 at its connector joint 32 [pivot point] to move down in the direction of Arrow A; but not so far down that the pedals 24 will touch ground during pedaling and initiating turns while pedaling.

With this downward movement at the pivot point 32, 33, the seat back bone 21 also moves in the direction of arrow B; but, such movement cannot be such that the seat back bone 21 will contact the rear wheel or adversely impact the performance and function of the rear wheel. The type of bias mechanism 40, its connecting locations, and the X-Y to W-Z angles ensure against such contact, produce a low-ride and soft-ride result, in a relative recumbent position for the rider.

Full compression of the biasing mechanism 40 is sought to be attained when a rider sits on the bicycle so constructed with the bike frame 10 of the present invention. Using a compression spring type biasing mechanism 40 causes the pivot point 32, 33 to comfortably move in the direction or arrow C when riding over bumps or on a rough terrain. The downward [arrow A] and upward [arrow C] movements of the pivot point 32, 33, because of the biasing mechanism 40, its features, and its placement, is smooth, effortless, and comfortable. This combination on a two-piece bike frame gives the rider that 'low-rider' appearance and what is termed a 'soft ride' in that the biasing mechanism with the weight of the rider forcing it to compress also eases the effects of any bumps in the road.

This 'low-rider' recumbent position is further facilitated by the placement of the crank mechanism 26 well forward of the seat tube 12 by use of the base tube 17, and upward from the base tube 17 so as not be permit the pedals 24 from contacting the ground while pedaling and turning by use of the crank riser 19 and its placement. The crank riser 19 is forward of the crank mechanism 26 and is angled rearward and upward to the crank mechanism 26.

This combination of down tube 18, crank mechanism 26, crank riser 19, and base tube 17 resembles a Z and is referred to as the Z-frame and is identified as reference character 15. The preferred angle between crank riser 19 and base tube 17 is approximately between 30° to approximately 60° with approximately 40° to 50° being preferred. This Z-frame 15 structure functions to maintain the proper angles between the X-Y plane and the W-Z plane while concomitantly establishing the low-riding recumbent ride and preventing the pedals 24 from contacting the ground. In addition the functionality of this Z-frame reduces stress on the body without reduction to and in style.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A bike frame comprising:
    (a) a front section comprising a neck, a down tube connected to said neck angling downward from and rearward of said neck, a crank attached to said down tube, a back bone attached to said neck, a seat tube attached to said back bone, a base tube having a front and a rear and a first axis having an angle of between approximately 5° to 40° greater than true horizontal, said base tube directly attached to said seat tube, a riser tube directly attached to the front of said base tube angling upward from and rearward of the front of said base tube connecting to said down tube and said crank;
    (b) a swing arm having a second axis with an angle of between approximately 5° to 40° greater than true horizontal, said swing arm directly and pivotably attached to said base tube at a point where said first axis intersects said second axis defining a pivot point thereat; and
    (c) a bias means attached to said swing arm at a first end at a point adjacent to said pivot point and at a second end to said seat tube.

2. The bike frame as claimed in claim 1 wherein said bias means is adapted to maintain an angle exceeding 180° between said first axis and said second axis when said bike frame is at rest.

3. The bike frame as claimed in claim 1 wherein said bias means is selected from a group consisting of compression springs, torsion springs, torsion bars, hydraulic springs, hydraulic pistons, pneumatic pistons, and combinations thereof.

4. The bike frame as claimed in claim 1 wherein said bias means has a rating of between approximately 500 to approximately 900 foot pounds.

5. The bike frame as claimed in claim 1 wherein said swing arm has a length D wherein said bias means is connected to said swing arm at a distance rearward from said pivot point which is between approximately 10% to approximately 25% of D.

6. The bike frame as claimed in claim 5 wherein said bias means is connected to said front section such that said bias means bears an angle, relative to true horizontal, of between approximately 30° to approximately 60°.

7. The bike frame as claimed in claim 1 wherein said riser tube and said base tube bear an angle in relation to one another of between approximately 30° to approximately 60°.

* * * * *